US008745254B2

(12) United States Patent
Ellis et al.

(10) Patent No.: US 8,745,254 B2
(45) Date of Patent: Jun. 3, 2014

(54) COMMUNICATING ARBITRARY DATA IN A CONCURRENT COMPUTING ENVIRONMENT

(75) Inventors: Edric Ellis, Huntingdon (GB); Jocelyn Luke Martin, Burwell (GB)

(73) Assignee: The MathWorks, Inc., Natick, MA (US)

( * ) Notice: Subject to any disclaimer, the term of this patent is extended or adjusted under 35 U.S.C. 154(b) by 1045 days.

(21) Appl. No.: 11/598,496

(22) Filed: Nov. 13, 2006

(65) Prior Publication Data

US 2008/0114842 A1 May 15, 2008

(51) Int. Cl.
*G06F 9/54* (2006.01)

(52) U.S. Cl.
USPC .......................... 709/230; 719/313

(58) Field of Classification Search
CPC .............. H04L 67/12; H04L 29/06163; H04L 29/06047; H04L 29/08135
USPC ......................................................... 719/316
See application file for complete search history.

(56) References Cited

U.S. PATENT DOCUMENTS 7,149,832 B2 * 12/2006 Wieland et al. ............... 710/269
7,765,561 B1 * 7/2010 Ellis ............................. 719/330

OTHER PUBLICATIONS

Kamal, H.; Penoff, B.; Wagner, A. SCTP Versus TCP for MPI. Supercomputing, 2005. Proceedings of the 2005 ACM/IEEE SC|05 Conference (SC'05)(Nov. 12-18, 2005). pp. 30-43.*
Pant, A.; Jafri, H. Communicating Efficiently on Cluster Based Grids With MPICH-VMI. 2004 IEEE International Conference on Cluster Computing (Sep. 20-23, 2004). pp. 23-33.*
Choy, R.; Edelman, A. Parallel MATLAB: Doing it Right. Proceedings of the IEEE. vol. 93, Issue 2 (Feb. 2005). pp. 331-341.*
Manolakos, E.; Galatopoullos, D.; Funk, A. Distributed MATLAB Based Signal and Image Processing Using Javaports. IEEE International Conference on Acoustics, Speech, and Signal Processing, 2004. Proceedings (ICASSP'04). vol. 5 (May 17-21, 2004). pp. V-217 to V-220.*
Hyungsoo Jung; Dongin Shin; Hyuck Han; Kim, J.W.; Yeom, H.Y.; Jongsuk Lee. Design and Implementation of Multiple Fault-Tolerant MPI over Myrinet M3. Supercomputing, 2005. Proceedings of the ACM/IEEE SC 2005 Conference (Nov. 12-18, 2005). pp. 32-46.*
Wu, J.; Wyckoff, P.; Dhabaleswar Panda. High Performance Implementation of MPI Derived Datatype Communication Over InfiniBand. Parallel and Distributed Processing Symposium, 2004. Proceedings. 18th International (Apr. 26-30, 2004). pp. 14-23.*
Dictionary.com, "arbitrary," in Dictionary.com Unabridged. Source location: Random House, Inc. [retrieved from http://dictionary.reference.com/browse/arbitrary on Jun. 21, 2010].*

(Continued)

*Primary Examiner* — H S Sough
*Assistant Examiner* — Brian W Wathen
(74) *Attorney, Agent, or Firm* — Nelson Mullins Riley & Scarborough LLP

(57) ABSTRACT

A communication protocol is provided for processes to send and receive arbitrary data in a concurrent computing environment. The communication protocol enables a process to send or receive arbitrary data without a user or programmer specifying the attributes of the arbitrary data. The communication protocol automatically determines the attributes of the arbitrary data, for example, the type and/or size of the data and sends information on the attributes of the data to a process to which the data is to be sent. Based on the information on the attributes of the data, the receiving process can allocate appropriate memory space for the data to be received.

8 Claims, 8 Drawing Sheets

(56) References Cited

OTHER PUBLICATIONS

G. Burns, R. Daoud and J. Vaigl, "LAM: An Open Cluster Environment for MPI," Super Computing Symposium '94 (Toronto, Canada, Jun. 1994) p. 1-8 [retrieved from http://www-lb.cams.aub.edu.lb/docs/files/lam-papers/lam-mpi.paper.pdf on Jun. 21, 2010].*

L. Ong, J. Yoakum, "An Introduction to the Stream Control Transmission Protocol (SCTP)", Network Working Group Request for Comments, RFC 3286 (May 2002) [retrieved from http://tools.ietf.org/pdf/rfc3286.pdf on Jun. 22, 2010].*

R. Stewart et al., "Stream Control Transmission Protocol", Network Working Group Request for COmments, RFC 2960 (Oct. 2000), pp. 1-84 [ retrieved from http://tools.ietf.org/pdf/rfc2960.pdf on Jun. 22, 2010].*

J.M. Squyres and A. Lumsdaine, "A Component Architecture for LAM/MPI", Euro PVM/MPI 2003, LNCS 2840, Springer-Verlag, Berlin (Oct. 28, 2003) pp. 379-387 [retrieved from http://www.springerlink.com/content/bd48n9ewnvey4hl7 on Jun. 23, 2010].*

Carpenter, B., Getov, V., Judd, G., Skjellum, A. and Fox, G. "MPJ: MPI-like message passing for Java", (Sep. 2000), Concurrency: Practice and Experience, vol. 12, Issue 11, pp. 1019-1038 [retrieved from http://onlinelibrary.wiley.com/ on Jan. 26, 2011].*

Kepner, J., "Matlab MPI Parallel Programming with Matlab MPI Reference Manual" (Apr. 30, 2003) [retrieved from http://www.omegacomputer.com/Pages/TrueCase/ on Jan. 27, 2011].*

Trefethen, A.; Menon, V.; Chang, C.; Czajkowski, G.; Myers, C.; Trefethen, L., "MutliMATLAB: MATLAB on Mulitple Processors" (1996), p. 1-16 [retrieved from http://citeseerx.ist.psu.edu/viewdoc/download?doi=10.1.1.56.3616&rep=rep1&type=pdf].*

Moler, C., "Cleve's Corner: Objectively Speaking", MATLAB News & Notes (Winter 1999), p. 1-2 [retrieved from http://www.mathworks.com/company/newsletters/news_notes/clevescorner/clevecorner.html].*

Silber, J., "Cornell Theory Center Releases New Parallel Programming Tools for MATLAB", MATLAB Newsreader (Jul. 21, 2000), p. 1-2 [retrieved from http://www.mathworks.com/matlabcentral/newsreader/view_thread/17983].*

Springer, P., "Source Code for Matpar Version 1.2" (Dec. 22, 1999), p. 1-315 [retrieved from https://www.openchannelsoftware.com/orders/get_ocs_order2.php?order_id=34357&sn=194726823 and https://www.openchannelsoftware.com/orders/get_ocs_order2.php?order_id=34358&sn=201252689].*

Springer, P., "Matpar: Parallel Extensions for MATLAB" (1998), p. 1-5 [retrieved from http://downloads.openchannelsoftware.org/MATPAR/pdpta98.pdf].*

Springer, P., "Matpar: Parallel Extensions for MATLAB Version 1.2" (Dec. 22, 1999), p. 1-16 [retrieved fromhttps://www.openchannelsoftware.com/orders/get_ocs_order2.php?order_id=34357&sn=194726823].*

Menon, V.; Trefethen, A., "MultiMATLAB: Integrating MATLAB with High-Performance Parallel Computing," Proceedings of the 1997 ACM/IEEE conference on Supercomputing (1997), p. 1-18 [retrieved from http://dl.acm.org/ft_gateway.cfm?id=509623&type=pdf&CFID=41780027&CFTOKEN=12790044].*

Kepner, J.; Ahalt, S., "MatlabMPI", J. Parallel Distrib. Comput., vol. 64 (2004), p. 997-1005 [retrieved from http://www.sciencedirect.com/science/article/pii/S0743731504000553].*

Lee, D. "Source Code for Parallel Matlab Interface (PMI)", (Mar. 19, 1999), p. 1-23 [retrieved from http://www.mathworks.com/matlabcentral/fileexchange/219-pmi].*

Geist, G.A.; Kohl, J.A.; Papadopoulos, P.M., "PVM and MPI: a Comparison of Features", (May 30, 1996), p. 1-16 [retrieved from http://citeseerx.ist.psu.edu/viewdoc/download?doi=10.1.1.42.4809&rep=rep1&type=pdf].*

Andrade, Lucio, "parmatlab," retrieved online at Matlab Central (2001).

Baldomero, Javier Fernandez, "MPI Toolbox for Matlab (MPITB)," obtained online at: http://atc.ugr.es/javier-bin/mpitb_eng (2005).

Choy, Long Yin, "MATLAB*P 2.0:Interactive Supercomputing," obtained online at: http://www.cs.ucsb.edu/~gilbert/cs290iSpr2003/ChoyThesis.ps. (2002).

Cornell University, "Cornell Multitask Toolbox for MATLAB," retrieved online at: http://www.tc.cornell.edu/services/support/forms/cmtm.p2.htm (2007).

Heiberg, Einar, "Matlab Parallelization toolklt," Matlab Central, version 1.20 (2003).

Kepner, Jeremy, "MatlabMPI," retrieved online at: http://www.11.mit.edu/mission/isr/matlabmpi/matlabmpi.html (2011).

Trefethen, Anne E. et al., "MultiMATLAB: MATLAB on Multiple Processors," Cornell University (1996).

* cited by examiner

COMMUNICATING ARBITRARY DATA IN A CONCURRENT COMPUTING ENVIRONMENT

COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

A technical computing environment provides mathematical and graphical tools for mathematical computation, data analysis, visualization and algorithm development. MATLAB® from The MathWorks, Inc. of Natick, Mass. is one example of technical computing environments. MATLAB® computing environment integrates numerical analysis, matrix computation, signal processing, and graphics in an easy-to-use environment where problems and solutions are expressed in familiar mathematical notation, without traditional programming. A technical computing environment can be used to solve complex engineering and scientific problems by developing mathematical models that simulate the problem.

A technical computing environment may allow scientists and engineers to interactively perform complex analysis and modeling in their familiar workstation environment. At times, users may want to use more than one computational unit executing a technical computing environment. Multiple computational units may be used to increase the computing power, to decrease computational time, to balance computing loads, or for other reasons as determined by one of skill in the art.

Applications that are traditionally used as desktop applications, may need to be modified to be able to utilize the computing power of concurrent computing. The term "concurrent computing" can refer to parallel and/or distributed computing—that is, it encompasses computing performed simultaneously or nearly simultaneously, as well as computing performed on different computing units, regardless of the timing of the computation.

A computation unit may be any unit capable of carrying out processing. Computation units may be, but are not limited to: separate processors, cores on a single processor, hardware computing units, software computing units, software threads, portable devices, biological computing units, quantum computing units, etc.,

SUMMARY OF THE INVENTION

An exemplary embodiment provides a computing environment in which a large computational job can be performed concurrently by multiple processes. This concurrent computing environment may include a client that creates the job. The job may include one or more tasks. The client may send the job or tasks to the multiple processes for the concurrent execution of the job. In the embodiment, the processes may establish communication channels with other processes so that the processes can collaborate to execute the job. The processes execute the job and may return execution results to the client directly or indirectly via an intermediary agent, such as a job manager.

The exemplary embodiment provides a communication protocol for processes to send and receive arbitrary data in a concurrent computing environment. The communication protocol enables the processes to send or receive arbitrary data without a user or programmer specifying the attributes of the arbitrary data. In the embodiment, the communication protocol automatically identifies the attributes of the arbitrary data, for example, the type and/or size of the data and sends information on the attributes of the data to a process to which the data is to be sent. Based on the information on the attributes of the data, the receiving process can allocate appropriate memory space for the data to be received.

In an exemplary communication protocol of the embodiment, a header message can be sent and received first with a fixed size and then payload messages can be sent and received. The header message may include information on the attributes of data to be sent and received, such as information on how to interpret the remainder of the header message and how many payload messages are needed to follow, and how to interpret the payload messages. When the data is small enough to fit in the header message, the data can be sent within the header message. The receiving process knows from the header message information how large the payload messages will be, and can allocate memory space for the payload messages accordingly.

In the exemplary embodiment, the communication protocol may allow the processes to perform error detection, user interrupt detection and/or deadlock detection while retaining the underlying speed of the communication. When an error, user interrupt request or deadlock occurs and hence it is not possible to send and/or receive a message, the communication protocol may enable the processes to cancel the communication. The communication protocol may also enable the processes to clear the partially sent message.

In one aspect, a method and a medium holding instructions executable in a computing device are provided for communicating data between processes in a concurrent computing environment. The attributes of data to be sent from a first process to a second process are determined. A header message is sent to the second process for providing information on the attributes of the data the second process.

In another aspect, a method and a medium holding instructions executable in a computing device are provided for communicating data between processes in a concurrent computing environment. A header message is received that includes information on the attributes of data to be received from a first process. Memory space is allocated for the data based on the information on the attributes of the data.

In another aspect, a system is provided for communicating data between processes in a concurrent computing environment. The system includes a first process for identifying attributes of data to be sent. The first process sends a header message for providing information on the attributes of data. The system also includes a second process for receiving the header message and for allocating memory space for the data based on the information on the attributes of the data in the header message.

BRIEF DESCRIPTION OF THE DRAWINGS

The foregoing and other objects, aspects, features, and advantages of the invention will become more apparent and may be better understood by referring to the following description taken in conjunction with the accompanying drawings, in which.

DETAILED DESCRIPTION

Figure 1:
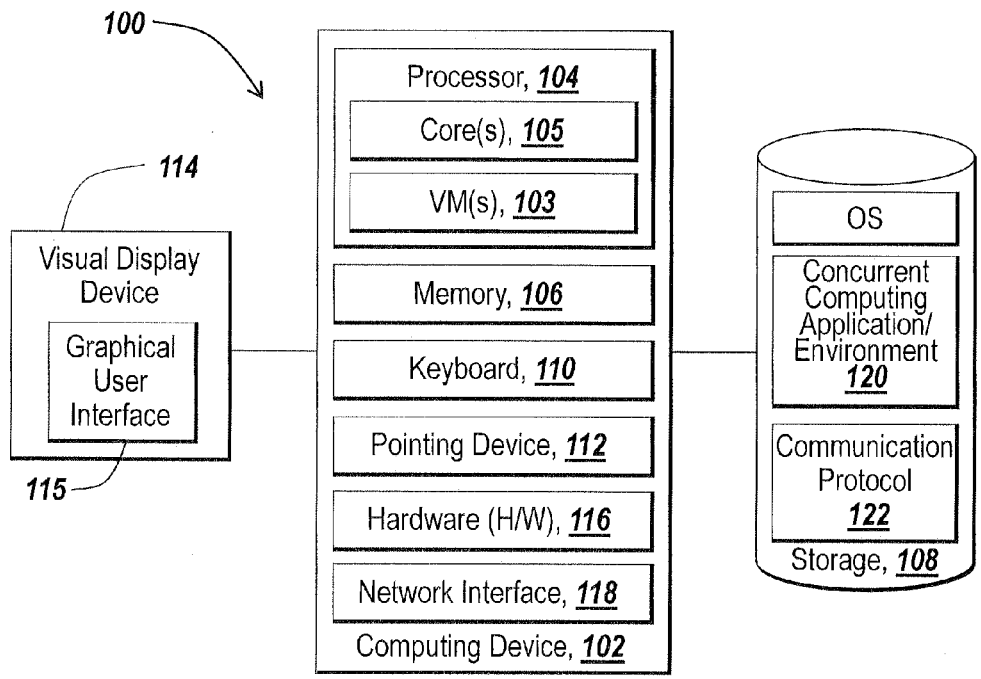
FIG. 1 is a block diagram of a computing device for practicing an exemplary embodiment.

An exemplary embodiment provides a communication protocol for computation units to send and receive arbitrary data between applications in a concurrent computing environment.

In one embodiment of the invention, a computation unit may need to have its local copy of the application or at least a part of the application. Between different instances of the application or different applications, there may need to be a way to communicate and pass messages and data, so that two or more computing units can collaborate with each other.

In an alternative embodiment of the invention, the application data or executable code may be loaded onto a computing unit prior to execution of the code.

Message passing is a form of communication used in concurrent computing in order to facilitate communication between two or more computing units. The applications execution on the computing units may be different instances of the same application, or they may be different versions of the same or similar application, or they may be entirely different applications and/or their execution instances.

Communication is accomplished by the sending of messages from one computing unit to another computing unit. Various messages may include function invocation, signals, data packets, a combination of any of the above, etc. One example of a message passing protocol that establishes a communication channel between computing units is Message Passing Interface (MPI). MPI is a message-passing library specification defining a collection of subroutines and arguments used for communication among nodes running a parallel program on a distributed memory system. Message passing protocols are not limited to MPI, and alternative embodiments of the invention may employ different protocols.

In standard message passing programming, a user or programmer is expected to specify how large the data the processes are sending and receiving is so that the processes can allocate memory space for storing the data. However, some programming languages or environments, such as MATLAB®, control the memory allocation directly and do not allow a user to control the memory allocation. In MATLAB®, memory allocation is not controlled by the user, and hence it is difficult for the user to know how much memory is being allocated and used for the data type. Therefore, it is desired to provide new communication protocols for sending and receiving an arbitrary data type in a concurrent computing environment.

A communication protocol may enable computing units to send or receive arbitrary data without a user or programmer specifying the attributes of the arbitrary data, for example, the size and/or type of the data. In an exemplary embodiment, the protocol specifies a fixed maximum size for a header message. In the exemplary embodiment, the communication protocol automatically identifies the attributes of the arbitrary data, and sends a header message with the attributes of the data to the computing units to which the data is to be sent. Based on the information on the attributes of the data in the header message, the receiving unit can allocate appropriate memory space for one or more payload messages to be received.

In the exemplary embodiment, the communication protocol may allow the computing units to perform error detection, user interrupt detection and/or deadlock detection while retaining the underlying speed of the communication. For example, when a header message indicates that a payload message follows, but a payload message doe not follow, it means that an error occurs. When an error, user interrupt request or deadlock occurs so that it is not possible to send and/or receive a message, the communication protocol enables the processes to cancel the communication. The communication protocol may also enable the processes to clean the partially sent message.

The exemplary embodiment provides an environment that enables a user to execute one or more computational jobs concurrently using multiple computing units. A job may include activities or tasks that are processed and/or managed collectively. The job may be a batch processing job or interactive processing job. A task may define a technical computing command, such as a MATLAB® command, to be executed, and the number of arguments and any input data to the arguments. In the exemplary embodiment, the concurrent computing system may include a client for creating the job. The client may be a user or a software application setting out the computing tasks. One or more clients may be used to control concurrent processing units executing computing tasks. A client may be a stand-alone application, an application of the same type as executing on one or more of the processing units, a client running in a web interface, a client embedded in scientific hardware, an application running on a portable device, etc. The client may send the job to one or more computing units for the execution of the job. The computing units execute the job and return the execution results to the client. The computing units may establish communication channels with other computing units so that the computing units can collaborate to execute the job. In an exemplary embodiment, the job may be executed in batch processing or interactive processing. As such, the exemplary embodiment executes the job using a concurrent computing system.

The exemplary embodiment will be described for illustrative purposes relative to a MATLAB®-based technical computing environment. Although the exemplary embodiment will be described relative to a MATLAB®-based application, one of ordinary skill in the art will appreciate that the present invention may be applied to distributing the processing of technical computing tasks with other technical computing environments, such as technical computing environments using software products of LabVIEW® or MATRIXx from National Instruments, Inc., or Mathematica® from Wolfram Research, Inc., or Mathcad of Mathsoft Engineering & Education Inc., or Maple™ from Maplesoft, a division of Waterloo Maple Inc., Comsol from Comsol AB of Sweden, GNU Octave.

FIG. 1 depicts an environment 100 suitable for practicing an exemplary embodiment. The environment includes a computing device 102 having memory 106, on which software according to one embodiment may be stored, one or more processors (CPUs) 104 for executing software stored in the memory 106, and other programs for controlling the device 102. The processor 104 may include single or multiple cores 105 for executing software and programs. The code loaded in the memory 12 may run in a virtualized environment, such as in a Virtual Machine (VM) 103. Multiple VMs 103 may be resident on a single processor. Also, in some instances, part of the application may be run in hardware (H/W) 116, for example, a graphics processing unit (GPU), digital signal processor (DSP), a field programmable gate array (FPGA) or an application specific integrated circuit (ASIC).

The memory 106 may include a computer system memory or random access memory (RAM), such as DRAM, SRAM, EDO RAM, etc. The memory 106 may include other types of memory as well, or combinations thereof. A human user may interact with the computing device 102 through a visual display device 114 such as a computer monitor, which may include a graphical user interface (GUI). The computing device 102 may include other I/O devices such a keyboard 110 and a pointing device 112, for example a mouse, for receiving input from a user. Optionally, the keyboard 110 and the pointing device 112 may be connected to the visual display device 114. The computing device 102 may include other suitable conventional I/O peripherals. Moreover, the computing device 102 may be any computer system such as a workstation, desktop computer, server, laptop, handheld computer or other form of computing or telecommunications device that is capable of communication and that has sufficient processor power and memory capacity to perform the operations described herein.

Additionally, the computing device 102 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, high-speed interconnects (e.g., InfiniBand, gigabit Ethernet, Myrinet) or some combination of any or all of the above. The network interface 118 may include a built-in network adapter, network interface card, PCMCIA network card, card bus network adapter, wireless network adapter, USB network adapter, modem or any other device suitable for interfacing the computing device 118 to any type of network capable of communication and performing the operations described herein.

The computing device 102 may further include a storage device 108, such as a hard-drive or CD-ROM, for storing an operating system (OS) and for storing application software programs, such as the MATLAB®-based concurrent computing application or environment 120. The MATLAB®-based concurrent computing application or environment 120 may run on any operating system such as any of the versions of the Microsoft® Windows operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. Furthermore, the operating system and the MATLAB®-based concurrent computing application or environment 120 can be run from a bootable CD, such as, for example, KNOPPIX®, a bootable CD for GNU/Linux.

The concurrent computing application 120 may include communication protocols 122 that enable the concurrent computing application or environment 120 to communicate with other computing applications or processes in a concurrent computing system. The communication protocols 122 may use message passing primitives for the concurrent computing application 120 to establish communication channels with other computing processes, or applications in the concurrent computing system. Message passing systems may permit programs with separate address spaces to synchronize with one another and move data from the address space of one process to that of another by sending and receiving messages. The message passing primitives may be provided as a shared library, such as DLL files on Windows and .so files on UNIX. The shared library enables the application 120 to dynamically open and close communication channels. The communication protocols 122 will be described below in more detail with reference to FIGS. 5-13.

Figure 2:
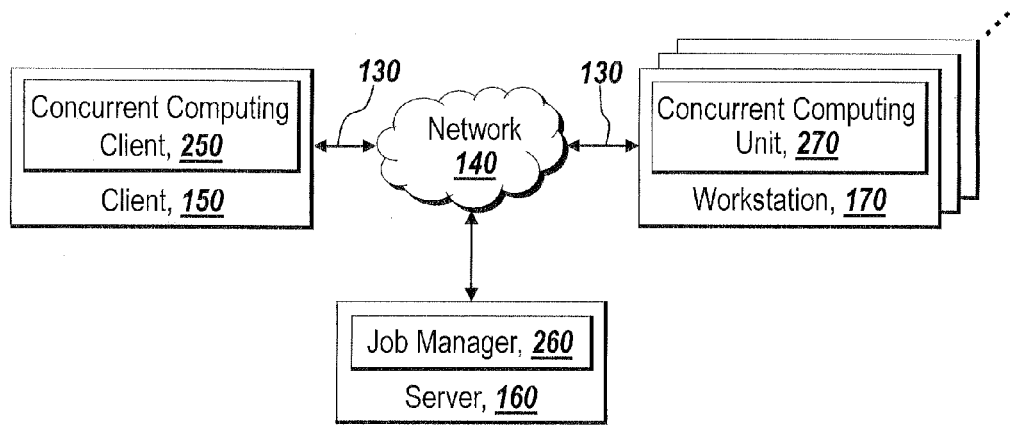
FIG. 2 is a block diagram of a concurrent computing system for practicing the exemplary embodiment.

FIG. 2 depicts an exemplary concurrent computing environment 200 suitable for practicing the exemplary embodiment. In the exemplary embodiment, the functionality of the computing application 120 is launched across multiple computing devices. The system 200 may include a client 150 in communications through a network communication channel 130 with workstations 170 over the network 140. The concurrent computing application 120 has one or more software components that run on each of the client 150 and workstations 170, and work in communication and in collaboration with each other to meet the functionality of the overall application.

The computing application 120 may include a concurrent computing client application 250, or concurrent computing client, running on a client computer 150 and a concurrent computing application 270, or concurrent computing unit, running on a workstation 170. The concurrent computing client 250 may be in communication through the network communication channel 130 on the network 140 with one, some or all of the concurrent computing units 270. The concurrent computing units 270 can be hosted on the same workstation, or a single concurrent computing unit 270 can have a dedicated workstation 170. Alternatively, one or more of the concurrent computing units 270 can be hosted on the client 150.

The concurrent computing client 250 can be a technical computing software application that provides a technical computing and graphical modeling environment for generating block diagram models and to define mathematical algorithms for simulating models. The concurrent computing client 250 can be a MATLAB®-based client, which may include all or a portion of the functionality provided by the standalone desktop application of MATLAB®. Additionally, the concurrent computing client 250 can be any of the software programs available in the MATLAB® product family. Furthermore, the concurrent computing client 250 can be a custom software program or other software that accesses MATLAB® functionality via an interface, such as an application programming interface, or by other means. One ordinarily skilled in the art will appreciate the various combinations of client types that may access the functionality of the system.

With an application programming interface and/or programming language of the concurrent computing client 250, functions can be defined representing a technical computing task to be executed by either a technical computing environment local to the client computer 150, or remote on the computing unit 170. The local technical computing environment may be part of the concurrent computing client 250, or a concurrent computing unit running on the client computer 150. The programming language includes mechanisms to define tasks to be distributed to a technical computing environment and to communicate the tasks to the concurrent computing units 270 on the workstations 170, or alternatively, on the client 150. Also, the application programming interface and programming language of the client 250 includes mechanisms to receive a result from the execution of technical computing of the task from another technical computing environment. Furthermore, the client 250 may provide a user interface that enables a user to specify the size of the collaboration of the concurrent computing units 270 for the execution of the job or tasks. The user interface may also enable a user to specify a concurrent computing unit 270 to be added to the collaboration or to be removed from the collaboration.

The concurrent computing unit 270 of the system 200 can be a technical computing software application that provides a technical computing environment for performing technical computing of tasks, such as those tasks defined or created by the concurrent computing client 250. The concurrent computing unit 270 can be a MATLAB®-based computing application, module, service, software component, or a session, which includes support for technical computing of functions defined in the programming language of MATLAB®. A session is an instance of a running concurrent computing unit 270 by which a concurrent computing client can connect and access its functionality. The concurrent computing unit 270 can include all the functionality and software components of the concurrent computing client 250, or it can just include those software components it may need to perform technical computing of tasks it receives for execution. The concurrent computing unit 270 may be configured to and capable of running any of the modules, libraries or software components of the MATLAB® product family. As such, the concurrent computing unit 270 may have all or a portion of the software components of MATLAB® installed on the workstation 170, or alternatively, accessible on another system in the network 140. The concurrent computing unit 270 is capable of performing technical computing of the task as if the concurrent computing client 250 was performing the technical computing in its own technical computing environment. The concurrent computing unit 270 also has mechanisms, to return a result generated by the technical computing of the task to the concurrent computing client 250.

A server 160 may be coupled to the network 140. The server 160 may include a job manager 260. The job manager 260 can provide control of delegating tasks and obtaining results in the concurrent computing system 200. The job manager 260 may provide an interface for managing a group of tasks collectively as a single unit called a job, and on behalf of a concurrent computing client 250, submitting those tasks making. up the job, and obtaining the results of each of the tasks until the job is completed. This eases the programming and integration burden on the concurrent computing client 250. For multiple task submissions from the concurrent computing client 250, the job manager 260 can manage and handle the delegations of the tasks to the concurrent computing units 270 and hold the results of the tasks on behalf of the concurrent computing client 250 for retrieval after the completion of technical computing of all the tasks.

Although the exemplary embodiment is discussed above in terms of the MATLAB®-based concurrent computing application across the computing devices of a client 150, server 160 and workstation 170, any other system and/or deployment architecture that combines and/or distributes one or more of the concurrent computing client 250, job manager 260 and concurrent computing units 270 across any other computing devices and operating systems available in the network 140 may be used. Alternatively, all or some of the software components of the MATLAB®-based concurrent computing application can run on a single computing device 102, such as the client 150, server 160 or the workstation 170.

Figure 3:
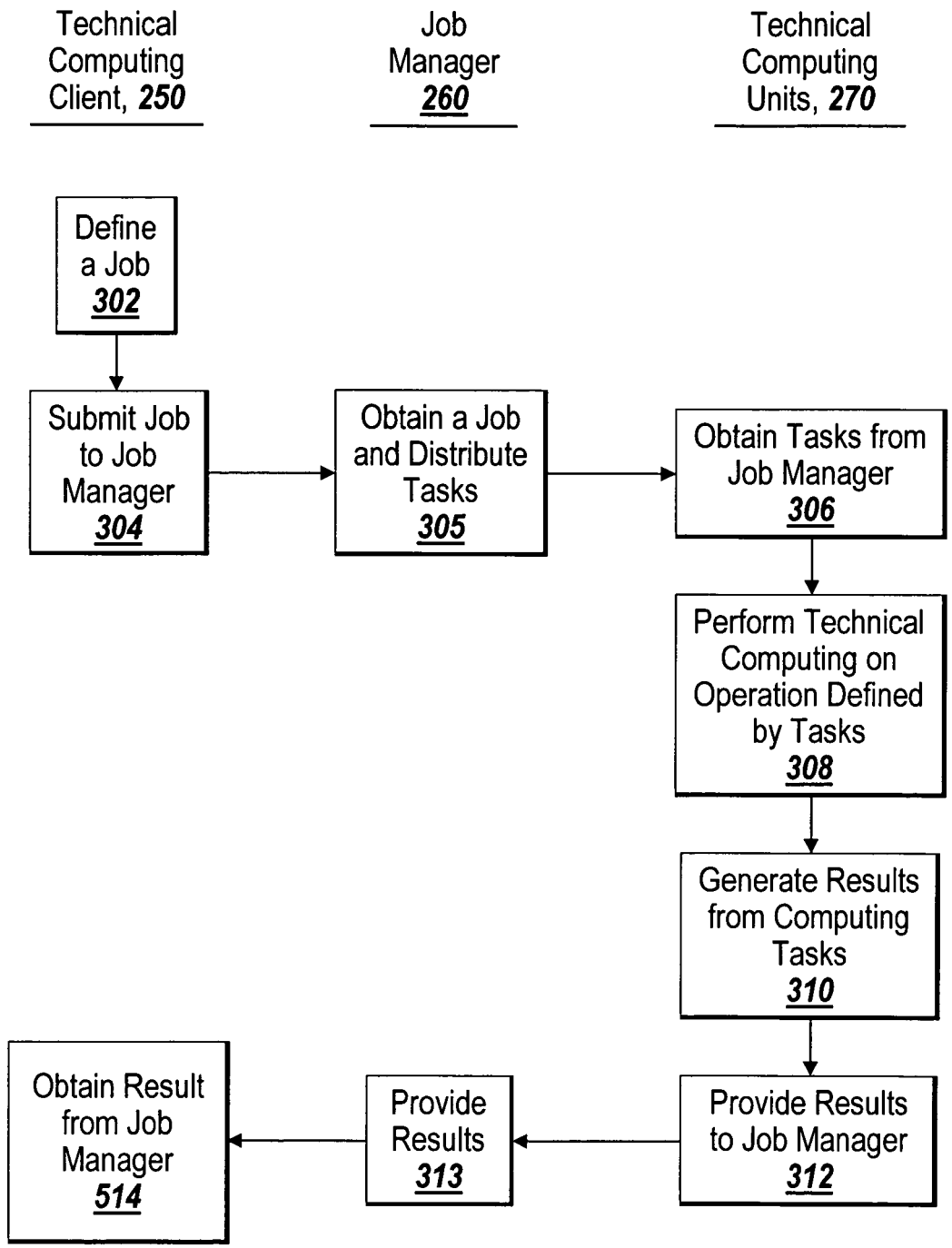
FIG. 3 is a flow chart showing an exemplary operation performed in the embodiment of FIG. 2.

FIG. 3 is a flow chart showing an example of operation of the concurrent computing system 200 depicted in FIG. 2. The concurrent computing client 250 defines a job including operations for technical computing (step 302). The job includes tasks defining functions, commands or operations, such as may be available in the programming language of MATLAB®, and the number of arguments and input data of the arguments. The concurrent computing client 250 then submits the job (step 304) to the job manager. The job manager 260 obtains the job and distributes the tasks to the concurrent computing units 270 (step 305). The concurrent computing units 270 receive the tasks (step 306) and perform the requested technical computing as defined by the tasks (step 308). In performing the technical computing on the tasks, associated results may be generated (step 310). In alternative embodiments, either no result is generated, or no result is required to be returned to the concurrent computing client 250. After generating the results from computing the tasks, the concurrent computing units 270 provide the result (step 312) to the job manager 260, which forwards the results to concurrent computing client 250 (step 313). The concurrent computing client 250 then obtains the result from the job manager 260 (step 314). In an exemplary embodiment, the tasks may be executed in batch processing or interactive processing.

Figure 4:
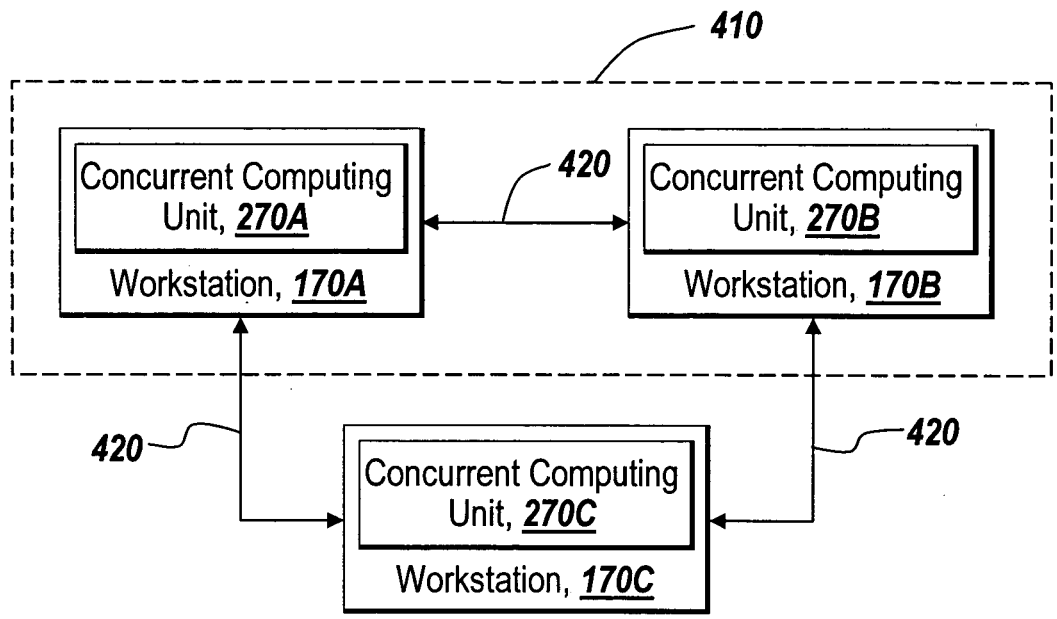
FIG. 4 is a block diagram illustrating a collaboration of concurrent computing units in the exemplary embodiment.
Figure 5:
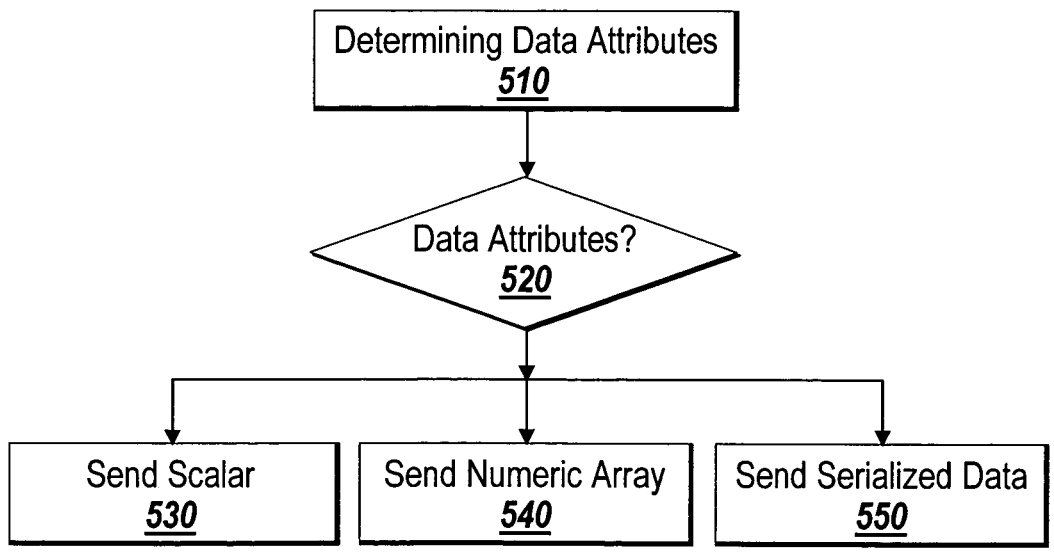
FIGS. 5-8 are flow charts showing an exemplary operation for sending arbitrary data in the exemplary embodiment.

FIG. 4 is a block diagram illustrating an exemplary collaboration of concurrent computing units. The concurrent computing units 270A, 270B, and 270C may be implemented on workstations 170A, 170B, and 170C, respectively, and may establish a communication channel 420 and form a collaboration 410. The concurrent computing units 270A, 270B, and 270C may communicate using the communication protocols 122. In one embodiment, the communication protocols 122 may use an MPI over high-speed connections, such as gigabit Ethernet, Myrinet and InfiniBand, etc. In other embodiments, the communication protocols 122 may use socket based communications over TCP/IP implementing a custom message specification. In further embodiments, the communication protocols 122 may use any available messaging communications products and/or custom solutions that allow the sending and receiving of messages among the concurrent computing units 270A, 270B, and 270C. In certain embodiments, the communication channel 420 may include a file interfacing mechanism such as reading and writing to files on a network accessible directory or common file system. Furthermore, the concurrent computing units 270A, 270B, and 270C can each be waiting or listening for messages from other concurrent computing units 270A, 270B, and 270C. One of ordinary skill in the art will recognize the various types of interfaces to communicate data or messages among the concurrent computing units 270A, 270B, and 270C.

FIGS. 5-8 are flow charts illustrating an exemplary operation for a computing unit to send one or more messages or data to another process. When a computing unit is required to send messages or data, the computing unit may send the messages or data using the communication protocols 122. The communication protocols 122 enable the computing unit to send arbitrary messages or data to another process. In the communication protocols 122, the computing unit may determine the attributes of data to be sent to another process (step 510). The attributes of data may include the type and/or size of the data. MATLAB® provides various types of data including scalar types and array types. An array is a collection of numbers and treated as a single variable. MATLAB® provides various types of arrays, such as numeric arrays, character arrays, logical arrays, cell arrays and structure arrays. A numeric array is an array that contains numeric values. A character array is an array that contains strings. The elements of a logical array are "true" or "false", which are not numeric quantities. A cell array and a structure array enable an array to store different types of data, for example, string data, real numbers and complex numbers. In a cell array, the data can be accessed by its location while in a structure array, the data can be accessed by name also. These arrays enable a user to create and use database having different types of information. In the exemplary embodiment, the arrays may be multidimensional. For example, a three dimensional array has the dimension m*n*q (m, n and q are the number of elements per dimension). A four dimensional array has the dimension of m*n*q*r (m, n, q and r are the number of elements per dimension), and so forth.

In the exemplary embodiment, the arrays may be dynamically typed. In a dynamically typed language, such as MATLAB®, types are assigned to each data value in memory at runtime, rather than assigning a type to a static, syntactic entity in the program source code. MATLAB® controls the memory allocation directly and does not allow a user to control the memory allocation. When a user assigns data type (a numeric, string, or structure array, for example) to a variable, MATLAB® allocates a block of memory and stores data in the block at runtime. The exemplary embodiment enables the process of dynamically typed languages to communicate with other processes using message passing primitives that require a user to specify, for example, the size of the data to be sent. Those of ordinary skill in the art, however, appreciate that although the exemplary embodiment is described relative to MATLAB® and MPI, other programming language processes and communication interfaces may be used.

Referring back to FIG. 5, depending upon the attributes of the data to be sent (step 520), the computing unit may perform separate functions calls for different communication protocols. In the exemplary embodiment, the computing unit may perform three different functional calls, such as SendScalar, SendNumericArray, and SendSerializedData. If the data is a scalar, the computing unit may perform SendScalar (step 530), which is described below with reference to FIG. 6. If the data is a numeric array, a character array or a logical array, the computing unit may perform SendNumericArray (step 540), which is described below with reference to FIG. 7. If the data is a cell array or a structure array, the computing unit may perform SendSerializedData (step 550), which is described below with reference to FIG. 8. Those of ordinary skill in the art will appreciate that the branch algorithm is illustrative and other implementations are possible for the communication protocols 122 in different embodiments. For example, the data can be sent using a generalized communication protocol (SendSerializedData in the embodiment) regardless of the types of the data. Exemplary code for the branch algorithm is provided as follows.

```
#define SCALAR_MESSAGE 1
#define NUMERIC_MESSAGE 2
#define SERIAL_MESSAGE 3
int labSend( mxArray * inData, int dest, int tag ) {
    if( mxIsScalarDouble( inData ) ) {
        return labSendScalar( inData, dest, tag );
    } else if( mxIsNumericDoubleArray( inData ) ) {
        return labSendNumericArray( inData, dest, tag );
    } else {
        return labSendSerialData( inData, dest, tag );
    }
}
```

Figure 6:
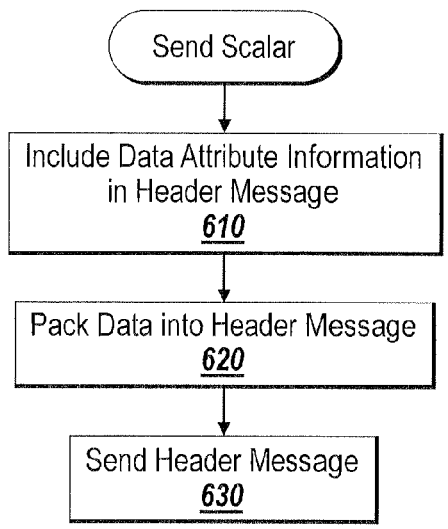

FIG. 6 is a flow chart illustrating an exemplary operation for a computing unit to send scalar data to another process. The computing unit may set the first element of a header message to indicate that the data is a scalar (step 610). The size of the header message may be predetermined by a user or programmer to have a fixed value, for example, 100 integer elements. Since the scalar data can fit within the header message, the computing unit may pack the scalar data in the header message (step 620). The data may be packed in such a way as to take account of the endianness and the word size of the process involved. The computing unit may then send the header message to another process using an MPI primitive for sending a message, such as MPI_Send (step 630). Exemplary code for SendScalar is provided as follows.

```
int labSendScalar( mxArray * inData, int dest, int tag ) {
    int header[100];
    double scalarValue = mxGetScalarValue( inData );
    header[0] = SCALAR_MESSAGE;
    memcpy( &header[1], &scalarValue, sizeof( double ) );
    return MPI_Send( header, 100, MPI_INT, dest, tag,
headerCommunicator );
}
```

In the exemplary code described above, the fourth line sets the first element of a header message to indicate that the data is a scalar type. From the first element of the header message, the receiver can expect that it will receive a scalar type of data. The fifth line packs the scalar type data into the header message. The sixth line sends the header message and returns MPI status.

Figure 7:
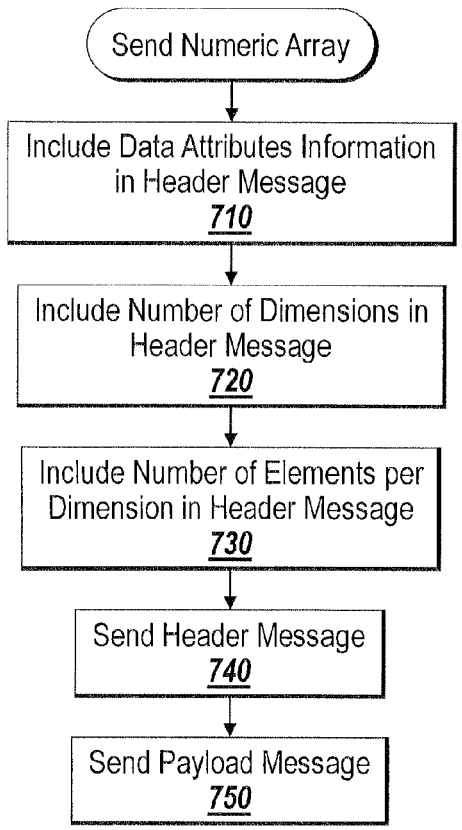

FIG. 7 is a flow chart illustrating an exemplary operation for a computing unit to send numeric array data to another process. The computing unit may set the first element of a header message to indicate that the data is a numeric array (step 710). The computing unit may include in the header message the number of dimensions of the numeric array (step 720). The computing unit may also include in the header message the number of elements in each dimension (step 730). Those of ordinary skill in the art will appreciate that the information included in the header message, such as the number of dimensions and the number of elements per dimension, is illustrative for identifying double-precision non-complex data, and the header message may include any information that can specify the data to be sent so that the receiving process can recreate the numeric array at the other end. The computing unit may send the header message to another process using an MPI primitive for sending a message, such as MPI_Send (step 740). The computing unit may then send one or more payload messages including the numeric array data using the MPI primitive (step 750). Exemplary code for SendNumericArray is provided as follows.

```
int labSendNumericArray( mxArray * inData, int dest, int tag ) {
    int header[100];
    int * dims = mxGetDimensions( inData );
    header[0] = NUMERIC_MESSAGE;
    header[1] = mxGetNumberOfDimensions( inData );
    memcpy( &header[2], dims, header[1] * sizeof( int ) );
    MPI_Send( header, 100, MPI_INT, dest, tag, headerCommunicator );
    return MPI_Send( mxGetData( inData ),
mxGetNumberOfElements( data ), MPI_DOUBLE,dest,
tag, payloadCommunicator );
}
```

Figure 8:
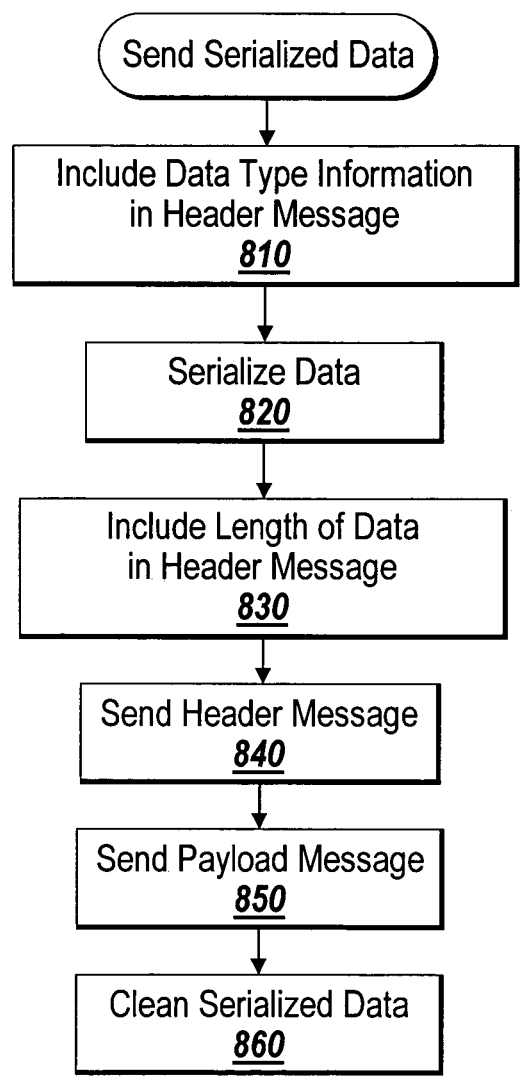
Figure 9:
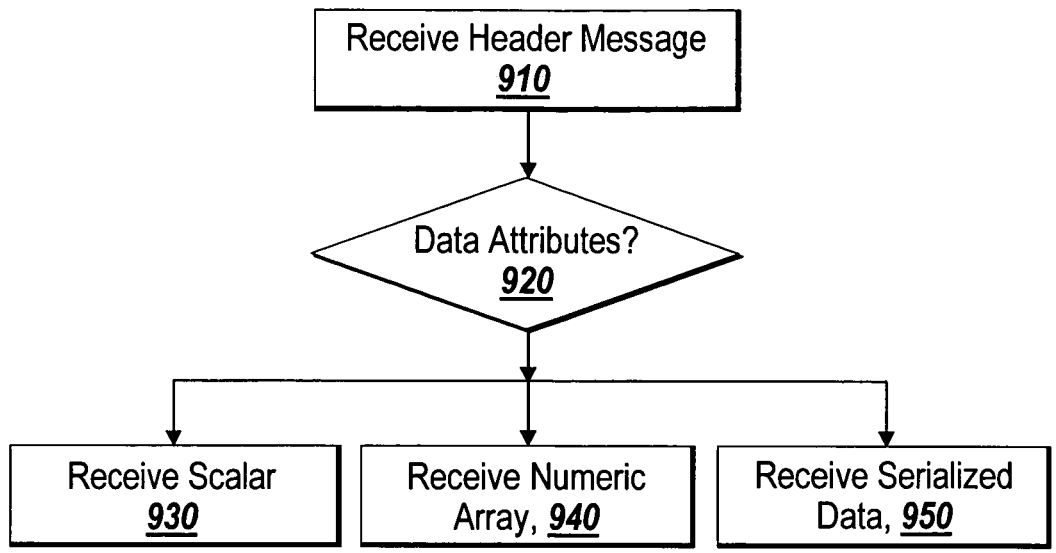
FIGS. 9-12 are flows chart showing an exemplary operation for receiving arbitrary data in the exemplary embodiment.

In the exemplary code described above, the fourth line sets the first element of a header message to indicate that the data is a numeric array. From the first element of the header message, the receiver can expect that it will receive a numeric array type of data. The fifth line sets the second element of the header message to specify the number of dimensions of the array data. The sixth line copies the number of elements per dimension into the header message. The seventh and eighth lines send the header message and payload messages, respectively, FIG. 8 is a flow chart illustrating an exemplary operation for a computing unit to send serialized data to another computing unit. This is one of generalized communication protocols that can be used for sending any arbitrary data. The computing unit may set the first element of a header message to indicate that the data is serialized data (step 810). The computing unit may serialize the data into a sequence of bytes (step 820), and determine the length of the serialized data. The computing unit may include in the header message the length of the serialized data so that a receiving process knows how long the serialized data is (step 830). The computing unit may send the header message to another process using an MPI primitive for sending a message, such as MPI_Send (step 840). The computing unit may then send one or more payload messages including the serialized data using the MPI primitive (step 850). After sending the serialized data, the computing unit may clear the memory space allocated for the serialized data (step 860). Exemplary code for SendSerializedData is provided as follows.

```
int labSendSerialData( mxArray * inData, int dest, int tag ) {
    int header[100];
    unsigned char * serialData;
    int serialLen;
    header[0] = SERIAL_MESSAGE;
    serializeMxData( inData, &serialData, &serialLen );
    header[1] = serialLen;
    MPI_Send( header, 100, MPI_INT, dest, tag, headerCommunicator );
    MPI_Send( serialData, serialLen, MPI_UNSIGNED_CHAR, dest, tag, payloadCommunicator );
    free( serialData );
}
```

In the exemplary code described above, the fifth line sets the first element of a header message to indicate that the data is serialized data. From the first element of the header message, the receiver can expect that it will receive serialized data. The function in the sixth line converts any arbitrary MATLAB® data type into a sequence of bytes. The seventh line sets the second element of the header message to specify the length of the serialized data. The eighth and ninth lines send the header message and one or more payload message. The tenth line frees the memory space allocated for the serialized data.

FIGS. 9-12 are flow charts illustrating an exemplary operation for a computing unit to receive one or more messages or data to another process. When a computing unit is required to receive messages or data, the computing unit may receive the messages or data using the communication protocols 122. The communication protocols 122 enable the computing unit to receive arbitrary messages or data from another process. In the communication protocols 122, the computing unit may receive a header message first (step 910). The size of the header message may be predetermined by a user or programmer to have a fixed value, for example, 100 integer elements. The header message may include information on the attributes of the data to be received. The attributes of data may include the type and/or size of the data. The first element of the header message may indicate the type of the data to be received. Depending upon the type of the data to be received (step 920), the computing unit may perform separate functions calls for different communication protocols. In the exemplary embodiment, the computing unit may perform three different functional calls, such as ReceiveScalar, ReceiveNumericArray, and ReceiveSerializedData. If the data is a scalar, the computing unit may perform ReceiveScalar (step 930), which is described below with reference to FIG. 10. If the data is a numeric array, a character array or a logical array, the computing unit may perform ReceiveNumericArray (step 940), which is described below with reference to FIG. 11. If the data is a cell array or a structure array, the computing unit may perform ReceiveSerializedData (step 950), which is described below with reference to FIG. 12. Those of ordinary skill in the art will appreciate that the branch algorithm is illustrative and other implementations are possible for the communication protocols 122 in different embodiments. For example, the data can be received using a generalized communication protocol (ReceiveSerializedData in the embodiment) regardless of the types of the data. Exemplary code for the branch algorithm is provided as follows.

```
int labReceive( mxArray ** outData, int src, int tag ) {
    int header[100];
    MPI_Status stat;
    int act_src, act_tag;
    MPI_Recv( header, 100, MPI_INT, src, tag, headerCommunicator, &stat );
    act_src = stat.MPI_SOURCE; act_tag = stat.MPI_TAG;
    switch( header[0] ) {
        case SCALAR_MESSAGE:
            return labReceiveScalar( header, outData, act_src, act_tag );
        case NUMERIC_MESSAGE:
            return labReceiveNumericArray( header, outData, act_src, act_tag );
        case SERIAL_MESSAGE:
            return labReceiveSerialData( header, outData, act_src, act_tag );
    }
}
```

In the exemplary code described above, the second line assigns 100 integer elements for a header message, which may be determined by the constraints of protocols as a programmer defined when writing the send and receive portions of the protocol. In the fifth line, a computing unit may receive a header message using an MPI primitive, such as MPI_Recv. The first element of the header message indicates the type of data to be received. From the seventh line, the communication protocol performs separate routines for receiving the data depending on the first element of the header message.

Figure 10:
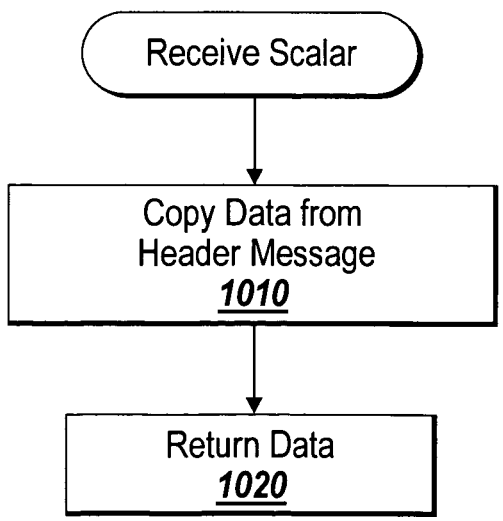

FIG. 10 is a flow chart illustrating an exemplary operation for a computing unit to receive scalar data from another process. Since the scalar data is packed within the header message, the computing unit may copy the data from the header message (step 1010). The function call may return the data to the computing unit so that the computing unit can access and use the data (step 1020). Exemplary code for ReceiveScalar is provided as follows.

```
int labReceiveScalar( int [ ] header, mxArray ** outData, int src, int tag ) {
    double scalarValue;
    memcpy( &scalarValue, &header[1], sizeof( double ) );
    *outData = mxCreateDoubleScalar( scalarValue );
    return MPI_SUCCESS;
}
```

In the exemplary code described above, the third line copies the payload value directly from the header message. The fourth line returns the payload value copied from the from the header message.

Figure 11:
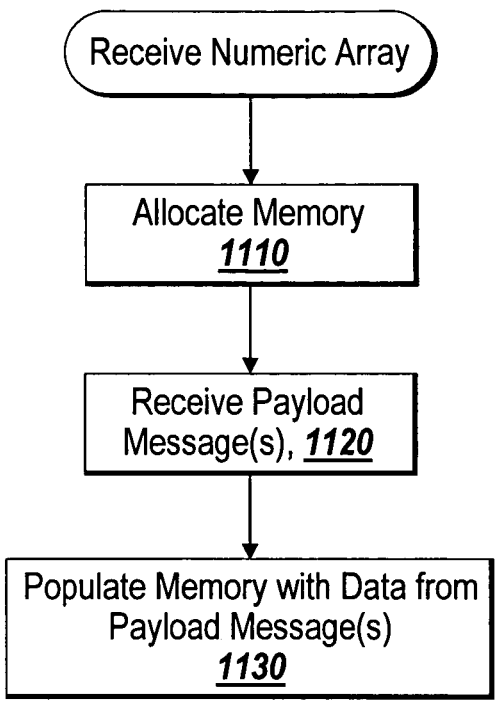

FIG. 11 is a flow chart illustrating an exemplary operation for a computing unit to receive numeric array data from another process. Based on the information in the header message about the number of dimensions of the numeric array, and the number of elements in each dimension, memory space is allocated for recreating the numeric array (step 1110). Those of ordinary skill in the art will appreciate that the information included in the header message, such as the number of dimensions and the number of elements per dimension, is illustrative for identifying double-precision non-complex data, and the header message may include any information that can specify the data so that the computing unit can allocate memory space for recreating the numeric array. Since the data is packed in one or more payload messages, the computing unit may receive the payload messages from another process using an MPI primitive for receiving a message, such as MPI_Receive (step 1120). The computing unit may then populate the allocated memory space with the data received in the payload messages (step 1130). Exemplary code for ReceiveNumericArray is provided as follows.

```
int labReceiveNumericArray( int [ ] header, mxArray ** outData, int
src, int tag ) {
    MPI_Status stat;
    *outData = mxCreateNumericArray( header[1], &header[2],
mxDOUBLE_CLASS, mxREAL );
    return MPI_Recv( mxGetData( *outData ), mxGetNumberOfElements(
*outData ), MPI_DOUBLE, src, tag, payloadCommunicator, &stat );
}
```

In the exemplary code, the third line allocates memory space for the data to be received. Since the first element of the header message indicates that the data is a numeric array, the memory space can be allocated based on the number of dimensions and the number of elements per dimension. The number of dimensions can be obtained from the second element of the header message and the number of elements per dimension can be obtained from the third element and thereafter. In the fourth line, one or more payload messages are received and stored in the allocated memory space.

Figure 12:
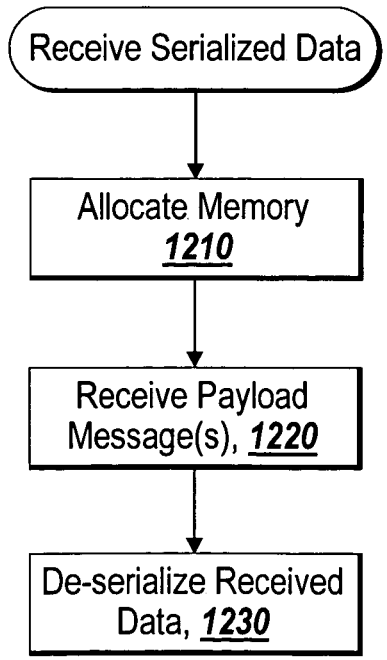

FIG. 12 is a flow chart illustrating an exemplary operation for a computing unit to receive serialized data from another process. This is one of generalized communication protocols that can be used for receiving any arbitrary data if it is serialized. Based on the information in the header message about the length of the serialized data, memory space is allocated for the serialized data (step 1210). Since the serialized data is packed in one or more payload messages, the computing unit may receive the payload messages from another process using an MPI primitive for receiving a message, such as MPI_Receive (step 1220). The computing unit may then deserialize the received data into the original representation (step 1230). Exemplary code for ReceiveSerializedData is provided as follows.

```
int labReceiveSerialData( int [ ] header, mxArray ** outData, int src,
int tag ) {
    int serialLen = header[1];
    unsigned char * serialData = (unsigned char*) malloc( serialLen *
sizeof( unsigned char ) );
    MPI_Status stat;
    int rc = MPI_Recv( serrialData, serialLen, MPI_UNSIGNED_CHAR,
src, tag, payloadCommunicator, &stat );
    if( rc == MPI_SUCCESS ) {
        *outData = deserializeMxData( serialData, serialLen );
    }
    return rc;
}
```

In the exemplary code, the length of serialized data to be received can be obtained from the second element of the header message (the second line). The third line allocates memory space for the serialized data to be received based on the length of the serialized data. In the fifth line, the serialized data is received via one or more payload messages and stored in the allocated memory space. The function in the seventh line de-serializes the received data.

The embodiment described above uses blocking message passing routines, such as MPI_Send and MPI_Receive. Blocking routines return only after the data buffer in the sending task is free for reuse, or block until the requested data is available in the data buffer in the receiving task. Some other embodiments may use a synchronous send to implement the blocking send. In the synchronous blocking communication, a send computing unit may send a message and block until the data buffer in the sending task is free for reuse and the receiving unit has started to receive the message.

Figure 13:
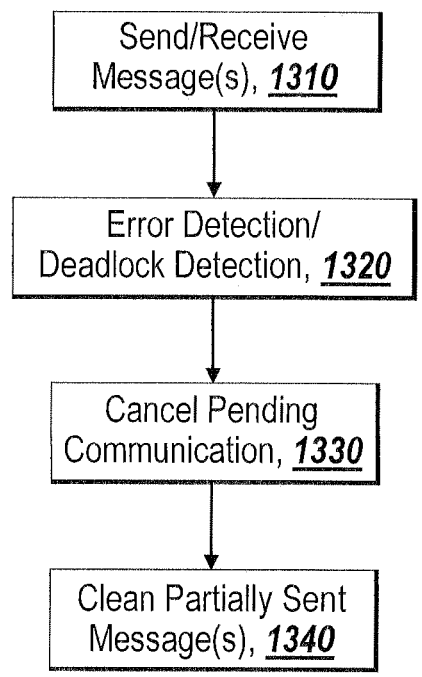
FIG. 13 is a flow chart showing an exemplary operation of another embodiment for communication protocols.

FIG. 13 is a flow chart illustrating an exemplary operation for a computing unit to send or receive data in another embodiment. In this embodiment, the communication protocols 122 may enable the computing unit to perform error detection, user interrupt detection and/or deadlock detection while retaining the underlying speed of the communication. The computing unit may send or receive data using MPI primitives, such as MPI_Isend and MPI_Ireceive, instead of MPI_Send and MPI_Receive primitives described above with reference to FIGS. 6-9 and 11-12, respectively (step 1310). MPI_Isend and MPI_Ireceive primitives are non-blocking message passing routines in which processing continues immediately without waiting for the message to be copied out from the data buffer, or to be received and copied into the data buffer. A communication request handle can be returned for handling the pending message status.

The computing unit may then perform error detection, user interrupt detection and/or deadlock detection while the data is being sent or received (step 1320). The user may request, for example, by pressing CTRL-C that the program is interrupted. When the request is detected, the process may cancel the communication request. In an embodiment, a checkpoint called barrier synchronization point is used to check for any communication mismatch in a concurrent computing program. The barrier synchronization point can be placed anywhere in a concurrent computing program as desired. Once a node has reached the barrier synchronization point, the node suspends execution and becomes idle to wait for other nodes to reach the barrier synchronization point as well. No node can leave the barrier synchronization point until all nodes have entered the barrier synchronization point. If a node attempts to initiate communication with another node that has already entered the barrier synchronization point, an error is raised immediately. Once all the nodes have reached the barrier synchronization point, any message in the send/receive buffer is flushed before resuming to normal execution to ensure that any communication mismatch before the barrier synchronization point does not continue past the barrier synchronization point. Each message to be flushed represents a communication mismatch and a warning or an error can be issued. Exemplary code for a communication with error detection, deadlock detection of user interrupt detection is provided as follows.

```
int pollForCompletion( MPI_Request req, MPI_Status * pStat ) {
    int done = 0;
    int rc;
    while( !done ) {
        if( deadlockDetected( ) ||
            errorDetected( ) ||
            userCancelled( ) ) {
            MPI_Cancel( &req );
            return MPI_ERR_OTHER;
        }
        rc = MPI_Test( &req, &done, pStat );
    }
    return rc;
}
```

The exemplary code described above checks whether a communication is completed or one of deadlock, communication error or user interrupt (e.g., CTRL-C), occurs during the communication. The fifth to seventh lines check for communication error, deadlock or user interrupt. If communication error, deadlock or user interrupt is detected, the process cancels the communication request at the eighth line. If communication error, deadlock and user interrupt is not detected, the process sets the "done" flag to 1 when the communication is complete (eleventh line).

To perform the error detection, deadlock detection or user interrupt detection during a communication, MPI_Send and MPI_Recv described above may be replaced by errDetectingSend and errDetectingReceive, which are described below with exemplary code.

```
int errDetectingSend( void * data, int count, MPI_Datatype type,
            int destination, int tag, MPI_Comm comm ) {
    MPI_Request req;
    MPI_Status stat;
    int rc;
    rc = MPI_Isend( data, count, type, destination, tag, comm, &req );
    if( rc == MPI_SUCCESS ) {
        return pollForCompletion( req, &stat );
    } else {
        return rc;
    }
}
int errDetectingReceive( void * data, int count, MPI_Datatype type,
            int source, int tag, MPI_Comm comm,
MPI_Status * pStat ) {
    MPI_Request req;
    int rc;
    rc = MPI_Isend( data, count, type, source, tag, comm, &req );
    if( rc == MPI_SUCCESS ) {
        return pollForCompletion( req, pStat );
    } else {
        return rc;
    }
}
```

Both methods described above initiate asynchronous communications, and wait for a process to complete using pollForCompletion, which is also described above.

The exemplary code described below shows how a partially transmitted message is flushed. The following method "flushingReceive" may be called repeatedly in a loop until it is determined that no further messages are available to be flushed.

```
int flushingReceive( mxArray ** outData, int src, int tag ) {
    int header[100];
    MPI_Status stat;
    int flag;
    MPI_Recv( header, 100, MPI_INT, src, tag, headerCommunicator,
&stat );
    MPI_Iprobe( stat.MPI_SOURCE, stat.MPI_TAG,
payloadCommunicator, &flag );
    if( !flag ) {
        return MPI_SUCCESS;
    } else {
        switch( header[0] ) {
            case SCALAR_MESSAGE:
                return labReceiveScalar( header, outData,
stat.MPI_SOURCE, stat.MPI_TAG );
            case NUMERIC_MESSAGE:
                return labReceiveNumericArray( header, outData,
stat.MPI_SOURCE, stat.MPI_TAG );
            case SERIAL_MESSAGE:
                return labReceiveSerialData( header, outData,
stat.MPI_SOURCE, stat.MPI_TAG );
        }
    }
}
```

The communication error or deadlock is typically detected during sending of a payload message (the header has already been sent) or during receiving of a payload message (i.e. during the period where the expected sender has not yet started sending a payload message). If there is at least a header message to be received, the fifth line receives the header message. The six line checks if there is a payload present to receive. If there is an error detected, there may be no payload messages. If there is no error detected, the process continues to receive payload messages. Each process can send at most one mismatched header message before a "flush" is performed.

Alternatively, instead of barrier synchronization points, regions can be used to implement the exemplary embodiment. Nodes that use the region-based implementation do not suspend execution when they are leaving one region and entering another. In one embodiment, each message is packaged with information that identifies the region that the sending node is in so that the receiving node can determine if such message can be successfully received without error. The receiving node checks if the region information in the message is compatible with the region that the receiving node is currently in and an error is raised if there is an incompatibility between the regions. In another embodiment, a sending node queries the region that the receiving node is in and compares the region of the receiving node with the region that the sending node is currently in. If the receiving node is in a compatible region with the sending node, then a message is sent from the receiving node to the sending node. However, if the receiving node is in an incompatible region with the sending node, then a communication mismatch is detected. In yet another embodiment, a message is sent by a sending node without information on the region that the sending node is in and the receiving node queries the region that the sending node is in before the receiving node successfully receives the message. If the region of the receiving node is compatible with the region of the sending node, then the receiving node successfully receives the message. If the region of the receiving node is incompatible with the region of the sending node, then a communication mismatch is detected.

The error detection, user interrupt detection and deadlock detection are described in more detail in co-pending U.S. patent application Ser. No. 11/488,432 filed Jul. 17, 2006 and entitled "RECOVERABLE ERROR DETECTION FOR CONCURRENT COMPUTING PROGRAMS." The content of the application is incorporated herein by reference in its entirety.

When an error, user interrupt request or deadlock occurs, or when it is not possible to send and/or receive data anymore, the communication protocols 122 may enable the computing unit to cancel the pending communication (1330). The communication protocols 122 may also enable the computing unit to clean memory space allocated for the partially sent message (step 1340).

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

What is claimed is:

1. A computing device implemented method comprising:
   programmatically identifying attributes of arbitrary data located at a first computing unit without requiring input from a user, the attributes of the arbitrary data including one of: a size of the data, a type of the data, or a size and type of the data, and where:
      the arbitrary data is to be sent from the first computing unit to a second computing unit,
      the first computing unit is executing a dynamically typed programming language in which memory allocation is controlled by the programming language and not by the user,
      a communication channel connects the first computing unit and the second computing unit, and
      the communication channel transports the arbitrary data;
   generating a header message, where:
      the header message is transported using the communication channel, and
      the header message has a predetermined size;
   inserting, based on the programmatically identifying, the attributes for the arbitrary data into the header message, where:
      the header message is a first communication sent from the first computing unit to the second computing unit in connection with the arbitrary data; and
      the header message transports the attributes from the first computing unit to the second computing unit for memory allocation at the second computing unit;
   sending the header message from the first computing unit to the second computing unit, the header message including the arbitrary data when the arbitrary data is of a size that fits in the header message;
   generating a payload message holding the arbitrary data when the arbitrary data exceeds the size that fits into the header message;
   sending the payload message subsequent to sending the header message; and
   performing error detection, user interrupt detection and deadlock detection while sending the payload message.

2. The method of claim 1, further comprising:
   canceling a pending communication between the first computing unit and the second computing unit when one or more of an error, a user interrupt request, or a deadlock is detected.

3. The method of claim 2, further comprising:
   clearing a partially sent message.

4. A computing device implemented method comprising:
   receiving a header message including information on attributes of arbitrary data residing on a first computing unit, the attributes of the arbitrary data including a size and type of the data, and where:
      the header message has a predetermined size,
      the header message is a first communication received from the first computing unit in connection with the arbitrary data, and
      the first computing unit is executing a dynamically typed programming language in which memory allocation is controlled by the programming language and not by a user,
   processing the header message;
   identifying the information on the attributes of the arbitrary data based on the processing;
   determining, based on the type of the data identified in the information on the attributes of the arbitrary data, a communication protocol to be used for receiving the arbitrary data;
   allocating memory space for the arbitrary data based on the information on the attributes of the arbitrary data, where the allocating is performed programmatically without requiring input from the user;
   receiving the arbitrary data using the determined communication protocol, where:
      the arbitrary data is included in the header message when the arbitrary data is of a size that fits in the header message, and
      the arbitrary data is included in a payload message received subsequent to the header message when the arbitrary data is of a size that exceeds the predetermined size of the header message; and
   storing the received arbitrary data in the allocated memory space.

5. A tangible non-transitory computer-readable medium holding one or more instructions that when executed on a processor, cause the processor to:
   programmatically identify attributes of arbitrary data residing at a first computing unit without requiring input from a user, the attributes of the arbitrary data including, one of: a size of the data, a type of the data, or a size and type of the data, and where:
      the arbitrary data is to be sent from a first computing unit to a second computing unit,
      the first computing unit is executing a dynamically typed programming language in which memory allocation is controlled by the programming language and not by the user,
      a communication channel connects the first computing unit and the second computing unit, and
      the communication channel transports the arbitrary data;
   generate a header message, where:
      the header message is transported using the communication channel, and
      the header message has a predetermined size;
   insert, based on the programmatically identifying, the attributes for the arbitrary data into the header message, where:

the header message is first a first communication sent from the first computing unit to the second computing unit in connection with the arbitrary data, and
the header message transports the attributes form the first computing unit to the second computing unit for memory allocation at the second computing unit;
send the header message from the first computing unit to the second computing unit, the header message including the arbitrary data when the arbitrary data is of a size that fits in the header message;
generate a payload message holding the arbitrary data when the arbitrary data exceeds the size that fits into the header message;
send the payload message subsequent to sending the header message; and
perform error detection, user interrupt detection and deadlock detection while sending the payload message.

6. A tangible non-transitory computer-readable medium holding one or more instructions that when executed on a processor, cause the processor to:
receive a header message including information on attributes of arbitrary data residing on a first computing unit, the attributes of the arbitrary data including a size and type of the data, and where:
the header message has a predetermined size,
the header message is a first communication received from the first computing unit in connection with the arbitrary data, and
the first computing unit is executing a dynamically typed programming language in which memory allocation is controlled by the programming language and not by a user;
process the header message;
identify the information on the attributes of the arbitrary data based on the processing;
determine, based on the type of the data identified in the information on the attributes of the arbitrary data, a communication protocol to be used for receiving the arbitrary data;
allocate memory space for the arbitrary data based on the information on the attributes of the arbitrary data where the allocating is performed programmatically without requiring input from the user;
receive the arbitrary data using the determined communication protocol, where:
the arbitrary data is included in the header message when the arbitrary data is of a size that fits in the header message, and
the arbitrary data is included in a payload message received subsequent to the header message when the arbitrary data is of a size that exceeds the predetermined size of the header message; and
store the received arbitrary data in the allocated memory space.

7. A system comprising:
a processor executing instructions to:
programmatically identify attributes of arbitrary data located at a first computing unit without requiring input from a user, the attributes of the arbitrary data including a size of the data, a type of the data, or a size and type of the data, and where:
the arbitrary data is to be sent from the first computing unit to a second computing unit,
the first computing unit is executing a dynamically typed programming language in which memory allocation is controlled by the programming language and not by the user,
a communication channel connects the first computing unit and the second computing unit, and
the communication channel transports the arbitrary data;
generate a header message, where:
the header message is transported using the communication channel, and
the header message has a predetermined size;
insert, based on the identifying, the attributes for the arbitrary data into the header message, where:
the header message is a first communication sent from the first computing unit to the second computing unit in connection with the arbitrary data, and
the header message transports the attributes from the first computing unit to the second computing unit for memory allocation at the second computing unit;
send the header message from the first computing unit to the second computing unit, the header message including the arbitrary data when the arbitrary data is of a size that fits in the header message;
generate a payload message holding the arbitrary data when the arbitrary data exceeds the size that fits into the header message;
send the payload message subsequent to sending the header message; and
perform error detection, user interrupt detection and deadlock detection while sending the payload message.

8. A system comprising:
a processor executing instructions to:
receive a header message including information on attributes of arbitrary data residing on a first computing unit, the attributes of the arbitrary data including a size and type of the data, and where:
the header message has a predetermined size,
the header message is a first communication received from the first computing unit in connection with the arbitrary data, and
the first computing unit is executing a dynamically typed programming language in which memory allocation is controlled by the programming language and not by a user;
process the header message;
identify the information on the attributes of the arbitrary data based on the processing;
determine, based on the type of the data identified in the information on the attributes of the arbitrary data, a communication protocol to be used for receiving the arbitrary data;
allocate memory space for the arbitrary data based on the information on the attributes of the arbitrary data, where the allocating is performed programmatically without requiring input from the user;
receive the arbitrary data using the determined communication protocol, where:
the arbitrary data is included in the header message when the arbitrary data is of a size that fits in the header message, and
the arbitrary data is included in a payload message received subsequent to the header message when the arbitrary data is of a size that exceeds the predetermined size of the header message; and
store the received arbitrary data in the allocated memory space.

* * * * *

UNITED STATES PATENT AND TRADEMARK OFFICE
CERTIFICATE OF CORRECTION

| | | |
|---|---|---|
| PATENT NO. | : 8,745,254 B2 | Page 1 of 1 |
| APPLICATION NO. | : 11/598496 | |
| DATED | : June 3, 2014 | |
| INVENTOR(S) | : Edric Ellis et al. | |

It is certified that error appears in the above-identified patent and that said Letters Patent is hereby corrected as shown below:

Title page 1, column 2, line 13, under "Other Publications", delete "M3." and insert --M^3.--

Title page 2, column 1, line 25, under "Other Publications", delete "Mulitple" and insert --Multiple--

Title page 2, column 2, line 8, under "Other Publications", delete "fromhttps://" and insert --from https://--

Title page 2, column 2, line 36, under "Other Publications", delete "toolklt," and insert --toolkit,--

In the Claims:

Column 19, line 1, in claim 5, after "is" delete "first"

Column 19, line 4, in claim 5, delete "form" and insert --from--

Column 19, line 41, in claim 6, delete "data" and insert --data,--

Signed and Sealed this
Ninth Day of September, 2014

Michelle K. Lee
*Deputy Director of the United States Patent and Trademark Office*